United States Patent
Klingler et al.

(10) Patent No.: US 6,651,453 B2
(45) Date of Patent: Nov. 25, 2003

(54) AIR-CONDITIONING DEVICE FOR A MOTOR VEHICLE

(75) Inventors: Dietrich Klingler, Heubach (DE); Dieter Schmadl, Marbach (DE); Werner Schwahn, Schwieberdingen (DE); Klaus Voigt, Bietigheim-Bissingen (DE)

(73) Assignee: Behr GmbH & Co., Stuttgart (DE)

( * ) Notice: Subject to any disclaimer, the term of this patent is extended or adjusted under 35 U.S.C. 154(b) by 0 days.

(21) Appl. No.: 10/060,334

(22) Filed: Feb. 1, 2002

(65) Prior Publication Data
US 2002/0104330 A1 Aug. 8, 2002

(30) Foreign Application Priority Data

Feb. 3, 2001 (DE) .......................... 101 04 907

(51) Int. Cl.⁷ ................................. B60H 1/32
(52) U.S. Cl. .................... 62/244; 165/42; 165/43; 454/156
(58) Field of Search .................. 62/244, 419, 426; 165/42, 43; 454/143, 156

(56) References Cited

U.S. PATENT DOCUMENTS

| | | | |
|---|---|---|---|
| 4,671,810 A | * | 6/1987 | Dietzsch et al. .............. 96/125 |
| 5,613,991 A | * | 3/1997 | Esaki et al. ................. 55/385.3 |
| 5,673,747 A | * | 10/1997 | Kousaka et al. .............. 165/41 |
| 5,709,601 A | | 1/1998 | Heck .......................... 454/121 |
| 5,881,558 A | * | 3/1999 | Kawahara et al. ............. 62/408 |
| 6,070,425 A | | 6/2000 | Ito et al. ..................... 62/285 |
| 6,093,096 A | * | 7/2000 | Miyata et al. ................ 454/139 |
| 6,101,828 A | | 8/2000 | Shikata et al. ................ 62/244 |
| 6,129,140 A | * | 10/2000 | Kawahara .................... 165/42 |
| 6,178,764 B1 | * | 1/2001 | Tanaka et al. ................ 62/296 |
| 6,280,316 B1 | * | 8/2001 | Loup .......................... 454/158 |
| 6,311,763 B1 | * | 11/2001 | Uemura et al. ............... 165/43 |
| 6,352,102 B1 | * | 3/2002 | Takechi et al. ............... 165/42 |
| 6,382,305 B1 | * | 5/2002 | Sano .......................... 165/43 |

FOREIGN PATENT DOCUMENTS

| | | |
|---|---|---|
| DE | 198 18 178 | 11/1998 |
| DE | 198 35 448 | 2/1999 |
| DE | 198 58 727 | 7/1999 |
| DE | 198 16 332 | 9/1999 |
| DE | 199 20 522 | 8/2000 |
| JP | 08132851 A * | 5/1996 |

* cited by examiner

Primary Examiner—William E. Tapolcai
Assistant Examiner—Mohammad M. Ali
(74) Attorney, Agent, or Firm—Foley & Lardner

(57) ABSTRACT

Disclosed is an air-conditioning device for a motor vehicle having a blower for feeding air through an air-conditioning housing, in which a cooling heat exchanger, a heating heat exchanger, and airflow control elements are arranged. The air-conditioning device and the heat exchangers have their greatest dimension in the transverse direction (y direction) of the vehicle. In order to provide a space-saving and cost-effective system, the blower is arranged laterally on the air-conditioning housing, and an air filter having approximately the same transverse dimension as the cooling heat exchanger is arranged in the air stream between the blower and cooling heat exchanger.

14 Claims, 6 Drawing Sheets

AIR-CONDITIONING DEVICE FOR A MOTOR VEHICLE

CROSS-REFERENCE TO RELATED PATENT APPLICATIONS

The right of priority under 35 U.S.C. §119(a) is claimed based on German Patent Application No. 101 04 907.2, filed Feb. 3, 2001, the entire disclosure of which is hereby incorporated by reference.

BACKGROUND OF THE INVENTION

The present invention relates to an air-conditioning device for a motor vehicle in which the air-conditioning device has its longest dimension in a direction transverse to the vehicle and to a motor vehicle embodying the improved air-conditioning device.

DE 198 58 727 discloses an air-conditioning system of this general type which has a shape that is stretched in the transverse direction of the vehicle in order to make better use of the installation space in the cockpit or dashboard region of a motor vehicle. In such an air-conditioning system, which has its greatest dimension in the transverse direction of the vehicle, the heat exchangers also have a construction that is stretched in the transverse direction of the vehicle. With such a construction, there is a problem of guiding the air fed by a blower in such a way that the heat exchangers are subjected to a uniform air flow over their entire length, despite the fact that they have a large dimension in the transverse direction of the vehicle. For this reason, the known air-conditioning system has a blower with a multiplicity of fan wheels that are arranged coaxially in the transverse direction of the vehicle, one next to the other along the extent of the air-conditioning system in the transverse direction of the vehicle. Such a blower is, on the one hand, not cost-effective and, on the other hand, requires a corresponding installation space, so that, although the known air-conditioning system can be of relatively narrow design in the vertical direction of the vehicle, it has a relatively large dimension in the longitudinal direction of the vehicle.

SUMMARY OF THE INVENTION

One principal object of the present invention is to avoid the above-mentioned disadvantages and to provide an improved air-conditioning device that makes optimum use of the installation space in the passenger compartment/dashboard region and is as cost-effective as possible.

A further object of the invention is to provide a motor vehicle embodying the improved air-conditioning device according to the invention.

In accordance with one aspect of the present invention, there has been provided an air-conditioning device for a motor vehicle, comprising: a housing; a blower arranged at one lateral end of the air-conditioning housing for feeding air through the housing; a cooling heat exchanger, a heating heat exchanger, and airflow control elements arranged in the housing, wherein the air-conditioning device and the heat exchangers have their greatest dimension in the transverse direction (y direction) of the vehicle; and an air filter having approximately the same dimension in the transverse direction of the vehicle as the cooling heat exchanger arranged between the blower and cooling heat exchanger.

In accordance with another aspect of the invention, there is provided a motor vehicle, comprising a passenger compartment defined by a dashboard and an air-conditioning device mounted in the dashboard, wherein the air-conditioning device comprises an air-conditioning device as defined above.

Further objects, features and advantages of the present invention will become apparent from the detailed description of preferred embodiments that follows, when considered together with the accompanying figures of drawing.

DETAILED DESCRIPTION OF PREFERRED EMBODIMENTS

Figure 1:
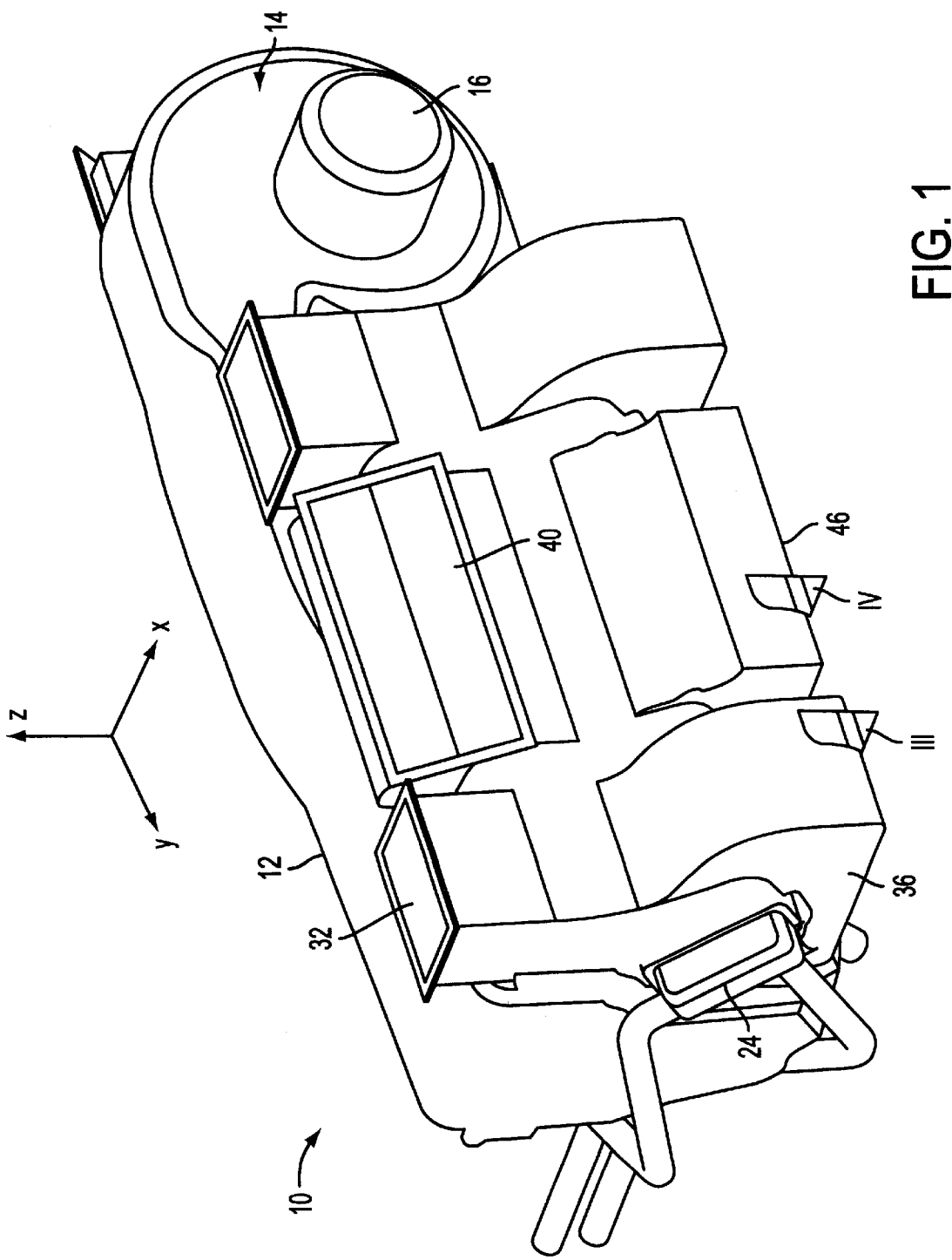
FIG. 1 is a front perspective view of an air-conditioning device according to the invention.

According to the invention, there is provided an air-conditioning system having its greatest dimension in the transverse direction of the vehicle, and in which a blower is arranged laterally on the air-conditioning housing. An air filter having approximately the same dimension in the transverse direction of the vehicle as the heat exchangers is arranged in the air stream between the blower and a cooling heat exchanger. A cost-effective blower which is used in contemporary air-conditioning systems, for example, a radial blower, can be used. The airflow is homogenized over the extent of the air-conditioning system in the transverse direction of the vehicle by the filter which is arranged between the blower and cooling heat exchanger (evaporator). The result is that the cooling heat exchanger is subjected to a uniform airflow, with one end of the cooling heat exchanger near to the blower and one end of the cooling heat exchanger remote from the blower being subjected to approximately equal partial air streams. As a result, it can be ensured that the air emerges more uniformly from the individual outlet ducts in the air-conditioning housing. In this way, it is possible, for example, to ensure that the windshield is acted on more evenly.

As a result of the lateral arrangement of the blower and the lateral introduction of air into the air-conditioning housing, it is possible to dispense with a diffuser between the blower and air-conditioning housing, such as is customary in contemporary air-conditioning systems. This also provides a saving in installation space. Furthermore, although the lateral arrangement of the blower increases the dimension in the transverse direction of the vehicle, the dimension in the longitudinal direction of the vehicle is, however, considerably shortened, so that the installation space in the passenger compartment/dashboard can be utilized in an improved way. In addition, the saving in installation space in the longitudinal direction of the vehicle enables conventional pivot air flaps to be used, whereas in the air-conditioning system known from DE 198 58 727, special film louver flaps are used in order to prevent the known air conditioning system from having an excessively large dimension in the longitudinal direction of the vehicle.

In one embodiment of the invention, the air filter is arranged so that it lies flat and essentially horizontally above the cooling heat exchanger, with the result that the air fed by the blower is fed through the filter from top to bottom. When a radial blower is used, the axis of the blower would then be positioned in the longitudinal direction of the vehicle, with the result that the blower, with its fan wheel, has a small dimension in the longitudinal direction of the vehicle and can be arranged to the side of the air-conditioning device in an installation space-saving fashion.

The cooling heat exchanger is preferably arranged in a "standing position", that is to say with an essentially vertical airflow face. This results in the significant advantage that condensation water generated on the cooling heat exchanger can run off in an improved way so that no condensation water can accumulate in the cooling heat exchanger and possibly could be sprayed into the air-conditioning device by the air stream. In the air-conditioning system known from DE 198 58 727, the cooling heat exchanger is arranged in a lying position, and the air blows counter to the runoff of water, causing difficulties in leading away condensation water. In order to overcome these difficulties, particular structures are necessary, such as those described, for example, in DE 198 35 448.

In another embodiment of the invention, there is provided along the filter an air bypass which can be closed off by means of at least one bypass flap, so that the air can also be fed unfiltered to the cooling heat exchanger. Since the air bypass extends over the entire length of the filter, and thus over the entire extent of the air-conditioning system in the transverse direction of the vehicle, the air bypass is essentially constructed as a narrow, elongate opening. Thus, when the air bypass is opened it is ensured that the air fed by the blower is distributed over the entire length of the air-conditioning system in the transverse direction of the vehicle. Even when the bypass is opened, the cooling heat exchanger is subjected to as uniform a flow of air as possible.

In order to permit left/right division of the air-conditioning system, at least one dividing wall which divides the air-conditioning device into two regions is provided, at least downstream of the heating heat exchanger.

The invention is explained in more detail below in terms of several exemplary preferred embodiments, with reference to the drawings.

For the following description of the exemplary preferred embodiments, it is useful to define a coordinate system such as is customary in the construction of motor vehicles. The x direction corresponds to the longitudinal direction of the vehicle, the y direction to the transverse direction of the vehicle, and the z direction to the vertical axis of the vehicle. For the sake of better comprehension, in each case the relevant coordinates are shown in the figures of the drawings.

An air-conditioning device 10 according to the invention has an air-conditioning housing 12 for guiding air to be conditioned and a blower 14 for feeding the air. The blower 14 comprises a blower motor 16, which drives a blower fan wheel 18. The blower 14 is preferably embodied as a radial blower, but any type blower can be used.

Figure 2:
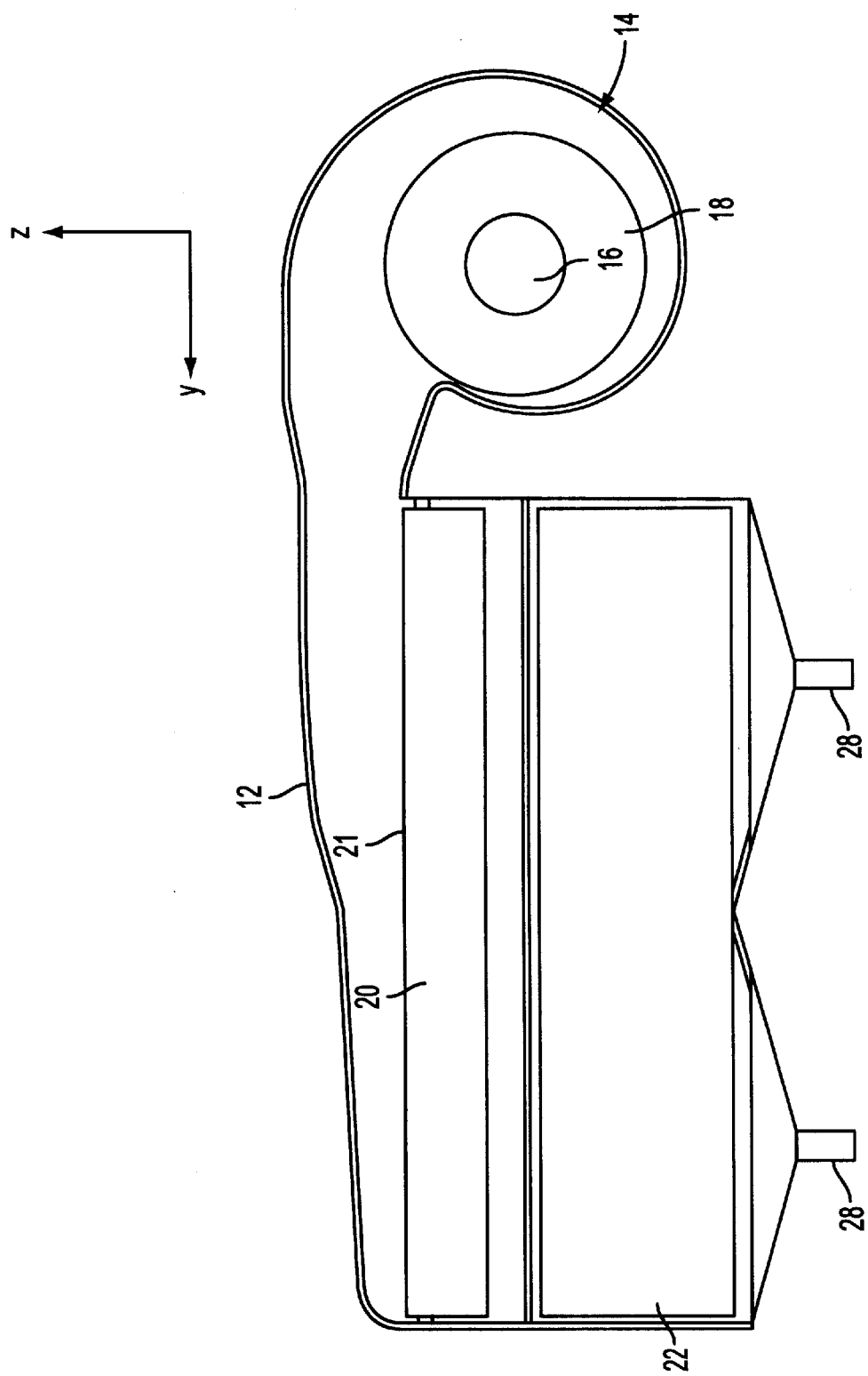
FIG. 2 is a cross-sectional view taken along the line II—II in FIG. 3.
Figure 3:
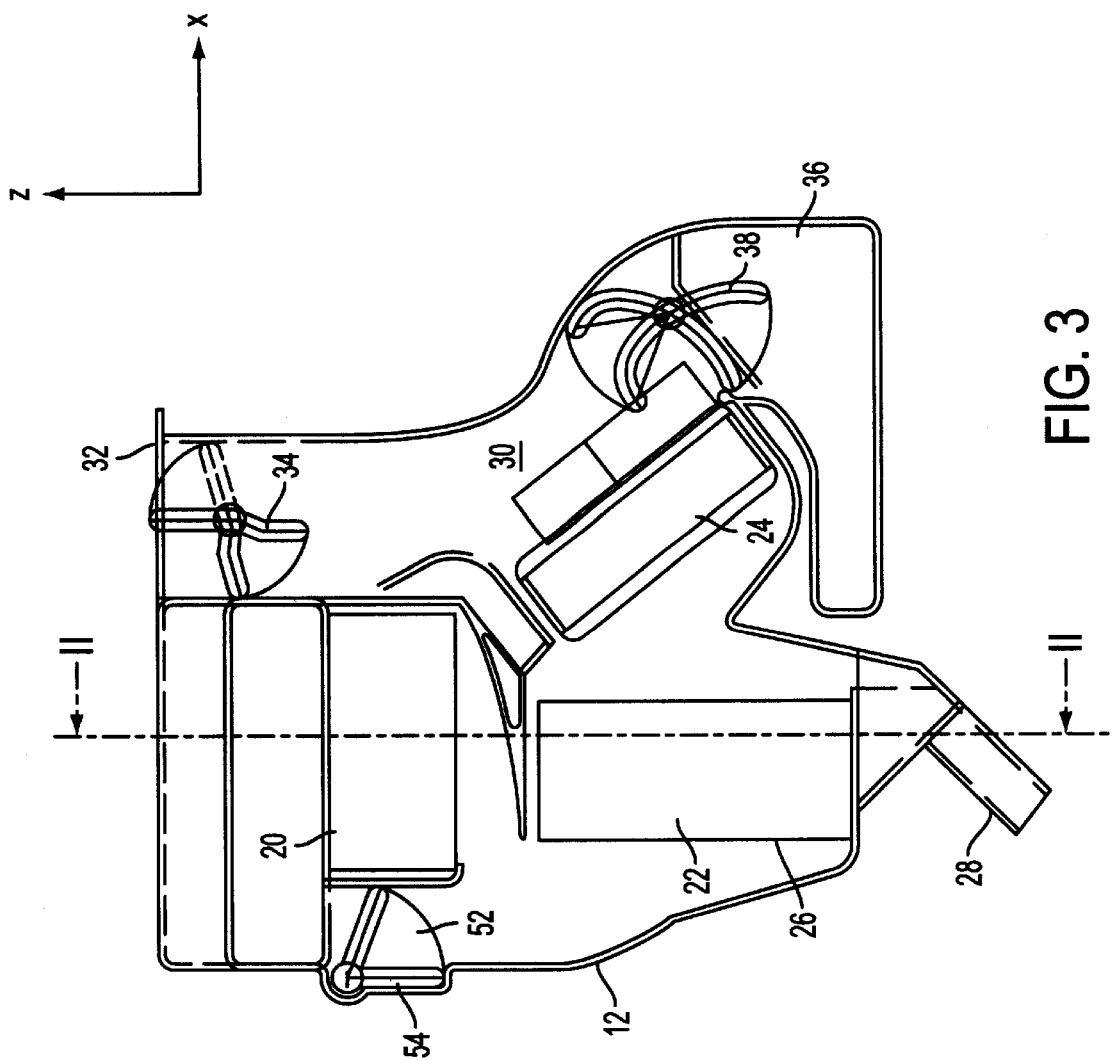
FIG. 3 is a cross-sectional view taken along the plane III in FIG. 1.

An air filter 20, a cooling heat exchanger 22 and a heating heat exchanger (heater) 24 for conditioning the air are arranged in the air-conditioning housing 12 (FIGS. 2 and 3). Various air outlets, which can be opened or closed by means of various airflow control elements, as explained in more detail below, are arranged downstream of the heating heat exchanger 24.

The blower 14 is arranged to the side of the air-conditioning housing 12, with the result that the blower 14 and the air-conditioning housing 12 lie one behind the other when viewed in the y direction. The air is thus blown laterally into the air-conditioning housing 12 in the y direction, specifically approximately parallel to an airflow face 21 of the air filter 20.

The air-conditioning housing 12 as well as the filter 20 and the heat exchangers 22 and 24 are of considerably stretched construction in the y direction, with the result that they have their greatest dimension in the y direction. Preferably, the y extent of these components is approximately at least five times as great as the x extent or z extent. The air filter 20 and the cooling heat exchanger 22 are preferably arranged with respect to one another in such a way that their airflow faces 21 and 26 are arranged approximately perpendicularly with respect to one another. The air filter 20 is most preferably arranged so that it lies flat above the cooling heat exchanger 22, as is shown in FIGS. 2 and 3, with the result that the air fed by the blower 14 is firstly blown in the y direction and can become homogenized above the filter 20, and then flows through the filter 20 from top to bottom in the z direction, is then deflected in the x direction and fed approximately horizontally through the cooling heat exchanger 22.

A filter bypass 52, which can be closed off by means of at least one filter bypass flap 54, is provided in the air stream parallel to the filter 20. Depending on requirements, the air can be fed filtered and/or unfiltered to the interior of the vehicle.

The air can be cooled in the cooling heat exchanger 22, and in most instances condensation water will be generated which can run out of the air-conditioning housing 12 via condensation water outflow ducts 28.

In a first exemplary preferred embodiment corresponding to FIGS. 1 to 4, the air cooled in the cooling heat exchanger 22 is conducted from the cooling heat exchanger 22 to a heating heat exchanger 24 in which the air can be heated again to a desired temperature. If it is desired to provide water-side temperature control, the temperature of the heating heat exchanger 24 can be regulated by means of the flow of water or other engine coolant through it.

The air can be fed to a windshield from a warm air chamber 30 which is located downstream of the heating heat exchanger 24, via a defrosting air outlet 32, which can be closed off by means of a defrosting air flap 34. The heated air can be fed to a footwell in the driver's area or front seat passenger's area via a footwell air outlet 36, which can be closed off by means of a footwell air flap 38.

In order to achieve left/right division of the temperature control, a dividing wall 31 is provided in the air-conditioning housing in the center viewed in the y direction, and at least downstream of the heating heat exchanger 24, with the result that the air-conditioning housing is of essentially mirror-symmetrical construction with respect to the plane of a dividing wall. There are therefore two defrosting air outlets 32 and two footwell air outlets 36, as is apparent in FIG. 1.

As illustrated in FIG. 1, a venting air opening 40, via which heated air can be fed from the warm air chamber 30 to the central (vertical) plane of the interior of the vehicle, is provided in the y direction next to each defrosting air outlet 32. It is possible to feed cold air to this air via a cooling air bypass 42 which can be shut off by a bypass flap 44 in order to be able to cool the air in the central plane as required. This may be desired for reasons of comfort.

Warm air can be fed to the rear space from the warm air chamber 30 by means of a rear space warm air flap 48 via, in each case, a rear space air duct 46 which is arranged in the y direction next to, in each case, one of the footwell air outlets, and/or cold air can be fed via a rear space cold air flap 50 via which cold air can be extracted from the space between the cooling heat exchanger 22 and the heating heat exchanger 24. As a result, the air fed to the rear space can be conditioned separately.

Figure 4:
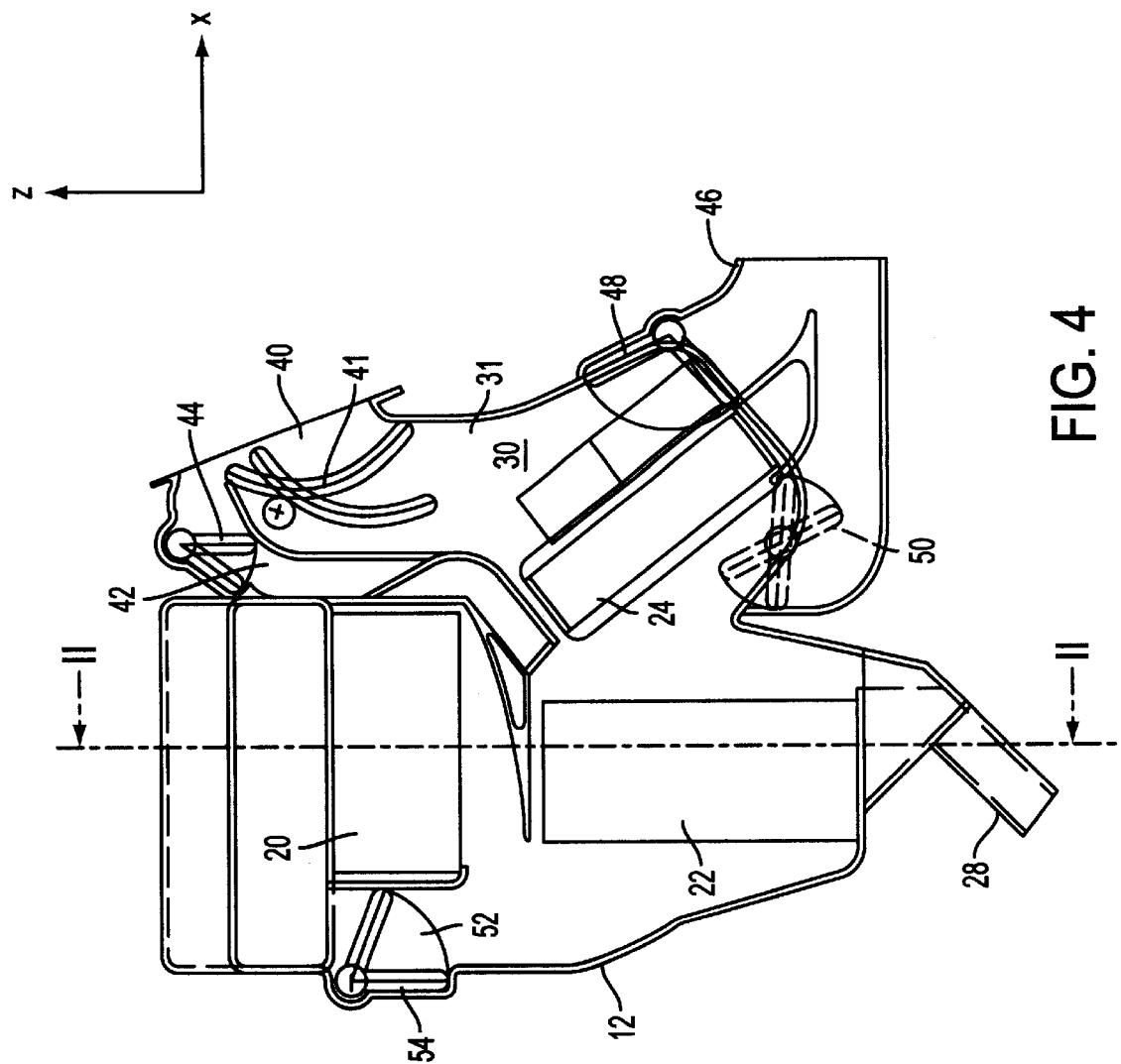
FIG. 4 is a cross-sectional view taken along the plane IV in FIG. 1.
Figure 5:
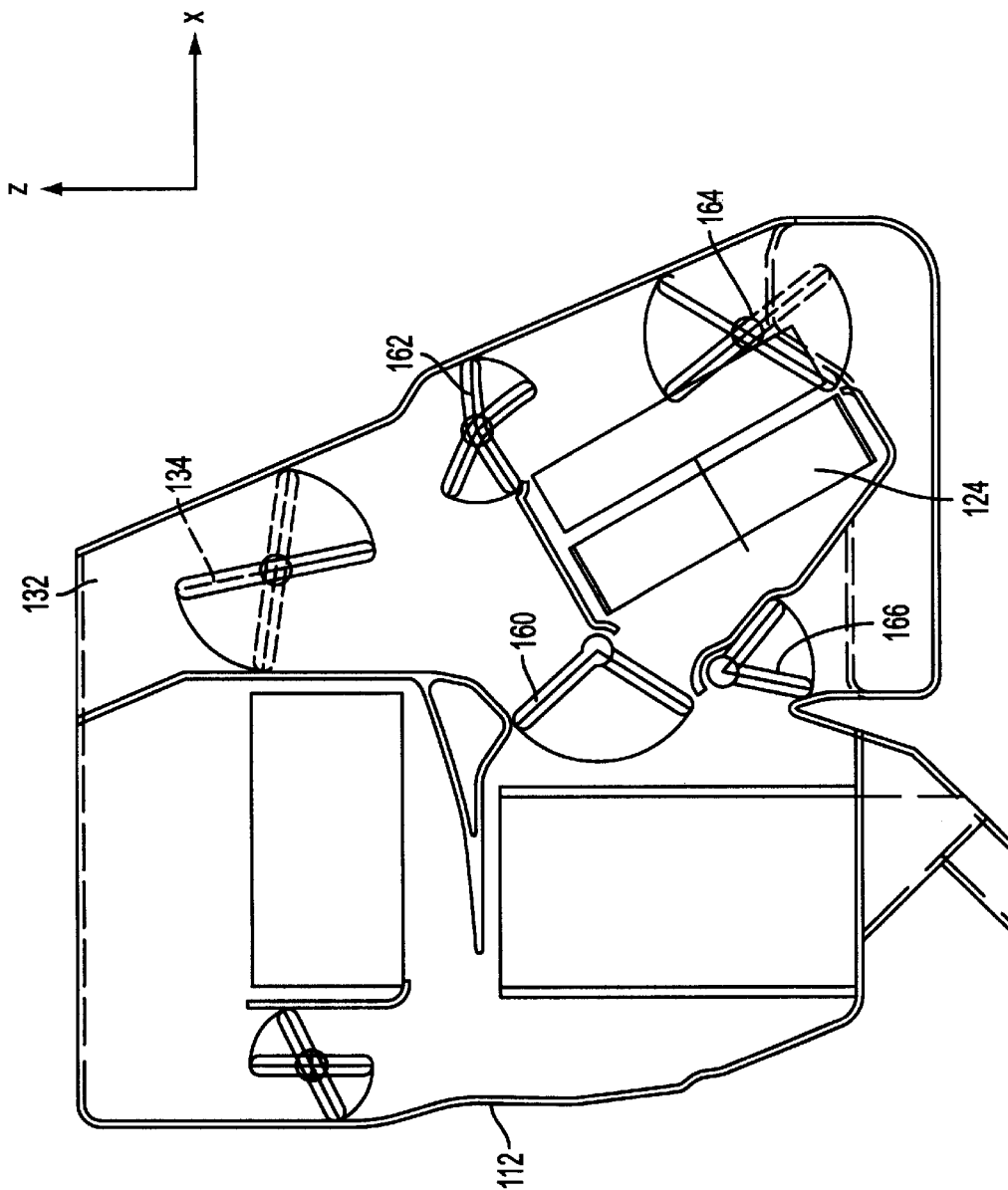
FIGS. 5 and 6 are cross-sectional views of a further embodiment corresponding to FIGS. 3 and 4, but with air-side control of the temperature.

Instead of water-side temperature control, as is described with reference to FIGS. 3 and 4, a further embodiment also provides the option of air-side temperature control. This will be explained by means of a further exemplary preferred embodiment illustrated in FIGS. 5 and 6. The sectional plane of FIG. 5 corresponds here to the sectional plane of FIG. 3, and the reference numerals relating to this further embodiment correspond essentially to the reference numerals of the first embodiment, except that the reference numerals are each increased by 100.

The defrosting air flap 134 for closing off the defrosting air outlet opening 132, (FIG. 5) the venting opening 140, with venting flap 141 (FIG. 6) and the cold air bypass 142, with cold air bypass flap 144 (FIG. 6) are already known from the first exemplary embodiments. In addition, a mixer flap 160, is provided as an additional temperature controlling element. With it either cold air can be made to bypass the heating heat exchanger 124 or cold air can be directed through the heating heat exchanger 124 in order to heat it. Downstream of the heating heat exchanger 124 is arranged, on the one hand, a warm air flap 162 with which warm air can be directed upwardly in the direction of the defrosting outlet opening 132 or the venting opening 140. In pure cold air operation, the flap 162 is closed, with the result that the (normally hot) heater 124 cannot heat the cold air when it is not desired. In the lower region of the warm air region downstream of the heater 124, there is arranged, in accordance with FIG. 5, a warm air footwell flap 164 via which warm air can be fed to the footwell for the driver's area or front seat passenger's area. Cold air can also be fed to the footwell via a footwell cold air flap 166.

Figure 6:
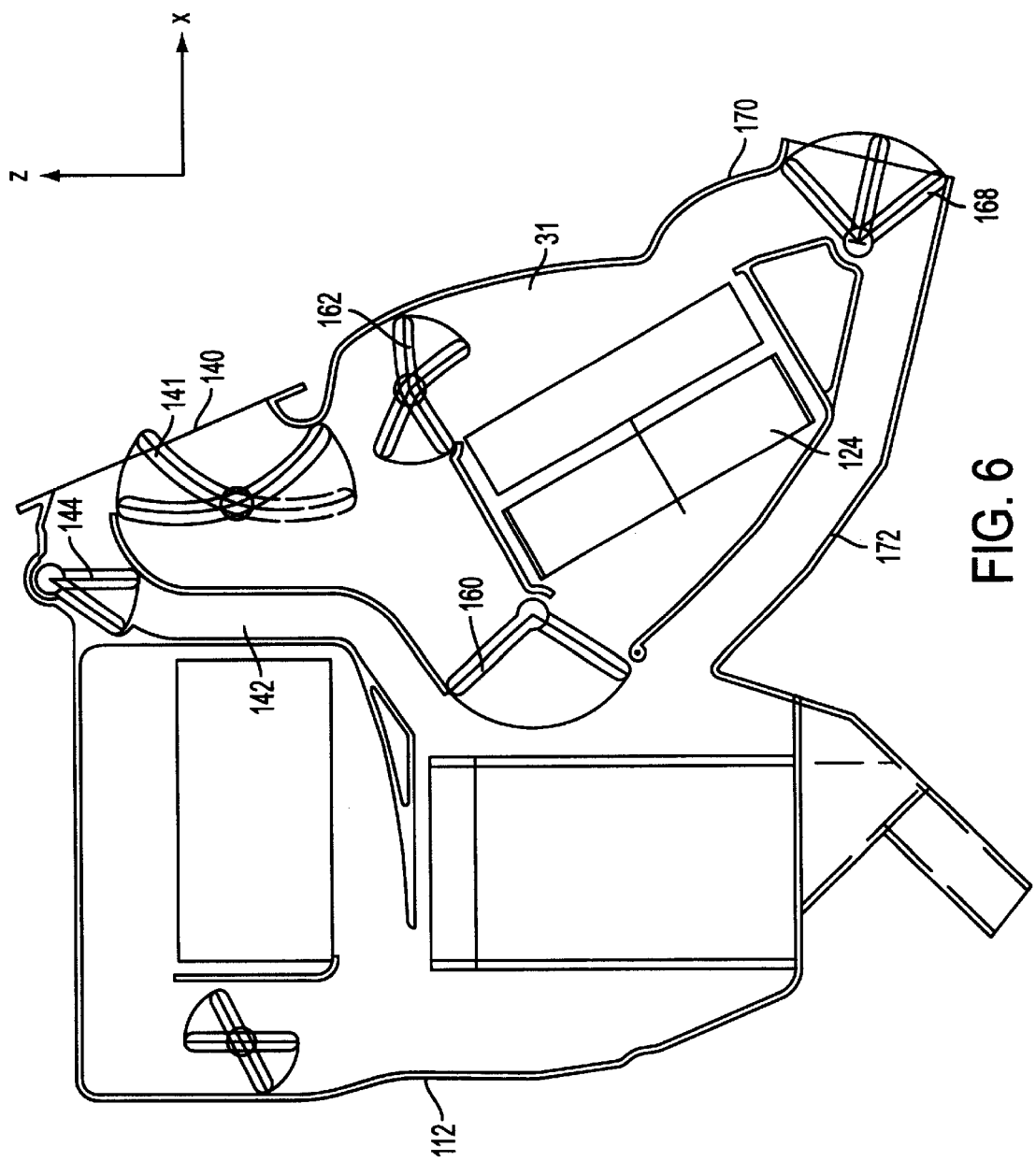

As in the first exemplary embodiment, the regions for conditioning the defrosting air and the footwell air (FIG. 5) are arranged next to the air conditioning regions, in the y direction, for venting the central plane and the rear space (FIG. 6).

The temperature of the air fed to the rear space can be set by means of a rear space mixer air flap 168, in that warm air or cold air or a mixture of warm and cold air can be fed to the rear space. For this purpose, a warm air duct 170 branches off downstream of the heater 124, and a rear space cold air duct 172 branches off from the cold air space located between the cooling heat exchanger 122 and the heater 124.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. For example, it is not necessary that the filter element actually function as a filter, as long as it produces the desired uniform pressure drop for the airflow. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and that the claims encompass all embodiments of the invention, including the disclosed embodiments and their equivalents.

What is claimed is:

1. An air-conditioning device for a motor vehicle comprising:
    a housing;
    a blower arranged at one lateral end of the air-conditioning housing for feeding air through the housing;
    a cooling heat exchanger, a heating heat exchanger, and airflow control elements arranged in the housing, wherein the air-conditioning device and the heat exchangers have their greatest dimension in the transverse direction (y direction) of the vehicle; and
    an air filter having approximately the same dimension in the transverse direction of the vehicle as the cooling heat exchanger arranged between the blower and the cooling heat exchanger, for providing a substantially uniform airflow through the cooling heat exchanger.

2. An air-conditioning device as claimed in claim 1, wherein the air filter is arranged generally horizontally above the cooling heat exchanger, whereby air fed by the blower passes through the filter from top to bottom.

3. An air-conditioning device as claimed in claim 2, wherein the air filter is generally planar.

4. An air-conditioning device as claimed in claim 2, wherein the housing is shaped so that air exiting the filter passes approximately horizontally through the cooling heat exchanger.

5. An air-conditioning device as claimed in claim 2, wherein the cooling heat exchanger is arranged generally vertically and has a generally vertical airflow face.

6. An air-conditioning device as claimed in claim 1, further comprising an air bypass along the filter and at least one bypass flap for selectively closing off the bypass.

7. An air-conditioning device as claimed in claim 1, further comprising at least one dividing wall dividing the air-conditioner housing into two regions at least downstream of the heating heat exchanger.

8. An air-conditioning device as claimed in claim 1, wherein at least the cooling heat exchanger has a dimension in the transverse direction of the vehicle that is a multiple of its dimension in the axial direction (x direction) of the vehicle.

9. An air-conditioning device as claimed in claim 8, wherein at least the cooling heat exchanger has a dimension in the transverse direction of the vehicle that is at least five times its dimension in the axial direction (x direction) of the vehicle.

10. An air-conditioning device as claimed in claim 1, wherein at least some of the airflow control elements comprise a single hinged air flap element.

11. An air conditioning device according to claim 1, herein the blower comprises an opening through which an air flow exits.

12. An air conditioning device according to claim 11, wherein the air filter is substantially planar and wherein the air filter is arranged in a lane substantially perpendicular to the plane of the opening through which the air flow exits the blower.

13. An air conditioning device according to claim 1, herein the air filter comprises a top surface and wherein the blower is arranged to low air in a direction substantially parallel to the top surface of the air filter.

14. A motor vehicle comprising a passenger compartment defined by a dashboard and an air-conditioning device mounted in the dashboard, wherein the air-conditioning device comprises:
    a housing;
    a blower arranged at one lateral end of the air-conditioning housing for feeding air through the housing;
    a cooling heat exchanger, a heating heat exchanger, and airflow control elements arranged in the housing, wherein the air-conditioning device and the heat exchangers have their greatest dimension in the transverse direction (y direction) of the vehicle; and
    an air filter having approximately the same dimension in the transverse direction of the vehicle as the cooling heat exchanger arranged between the blower and the cooling heat exchanger, for providing a substantially uniform airflow through the cooling heat exchanger.

* * * * *